(12) United States Patent
Bae et al.

(10) Patent No.: US 11,182,872 B2
(45) Date of Patent: Nov. 23, 2021

(54) PLENOPTIC DATA STORAGE SYSTEM AND OPERATING METHOD THEREOF

(71) Applicant: Electronics and Telecommunications Research Institute, Daejeon (KR)

(72) Inventors: Seong-Jun Bae, Daejeon (KR); Do-Hyung Kim, Sejong-si (KR); Jae-Woo Kim, Daejeon (KR); Seong-Jin Park, Seoul (KR); Ho-Wook Jang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 117 days.

(21) Appl. No.: 16/671,628

(22) Filed: Nov. 1, 2019

(65) Prior Publication Data

US 2020/0143505 A1 May 7, 2020

(30) Foreign Application Priority Data

Nov. 2, 2018 (KR) .................... 10-2018-0133535
Apr. 12, 2019 (KR) .................... 10-2019-0042863

(51) Int. Cl.
*G06T 1/00* (2006.01)
*G06T 9/00* (2006.01)
(Continued)

(52) U.S. Cl.
CPC ............ *G06T 1/0007* (2013.01); *G06T 7/557* (2017.01); *G06T 9/00* (2013.01); *H04N 5/37452* (2013.01);
(Continued)

(58) Field of Classification Search
None
See application file for complete search history.

(56) References Cited

U.S. PATENT DOCUMENTS 8,155,456 B2\* 4/2012 Babacan ............ H04N 19/597
382/232
9,219,905 B1\* 12/2015 Georges, III ........ H04N 19/597
(Continued)

FOREIGN PATENT DOCUMENTS

JP 2017188729 A 10/2017
KR 1020150106879 A 9/2015
(Continued)

OTHER PUBLICATIONS

Bennett Wilburn et al., "High Performance Imaging Using Large Camera Arrays," ACM Transactions on Graphics, Jul. 2005, pp. 765-776, vol. 24, No. 3, (Proceedings of ACM SIGGRAPH 2005), Los Angeles, California, USA.
(Continued)

*Primary Examiner* — Anand P Bhatnagar
(74) *Attorney, Agent, or Firm* — William Park & Associates Ltd.

(57) ABSTRACT

Disclosed herein is a method of operating a plenoptic data storage system. The method may include obtaining plenoptic image data from a plenoptic camera array, generating additional information pertaining to the plenoptic image data, performing compression-coding on the plenoptic image data, and storing the additional information and the compression-coded plenoptic image data in a storage device in accordance with a storage format.

14 Claims, 7 Drawing Sheets

(51) Int. Cl.
*G06T 7/557* (2017.01)
*H04N 5/3745* (2011.01)

(52) U.S. Cl.
CPC ............ *G06T 2200/21* (2013.01); *G06T 2207/10052* (2013.01)

(56) References Cited

U.S. PATENT DOCUMENTS

| | | | |
|---|---|---|---|
| 9,851,693 B2 | 12/2017 | Park et al. | |
| 9,883,151 B2* | 1/2018 | Kim | H04N 5/23229 |
| 10,341,632 B2* | 7/2019 | Pang | G06F 3/0304 |
| 10,390,005 B2* | 8/2019 | Nisenzon | H04N 13/117 |
| 2010/0141802 A1* | 6/2010 | Knight | H04N 5/2254 |
| | | | 348/240.3 |
| 2010/0265385 A1* | 10/2010 | Knight | G02B 27/0075 |
| | | | 348/340 |
| 2014/0092281 A1* | 4/2014 | Nisenzon | H04N 13/111 |
| | | | 348/262 |
| 2016/0255333 A1* | 9/2016 | Nisenzon | G06T 7/55 |
| | | | 348/47 |
| 2018/0350038 A1* | 12/2018 | Cen | G06T 5/50 |

FOREIGN PATENT DOCUMENTS

| | | |
|---|---|---|
| KR | 1020180053668 A | 5/2018 |
| WO | 2014094874 A1 | 6/2014 |
| WO | 2017046395 A2 | 3/2017 |

OTHER PUBLICATIONS

Bennett Wilburn et al., "High-Speed Videography Using a Dense Camera Array,", Jun. 27-Jul. 2, 2004, Proceedings of the 2004 IEEE Computer Society Conference on Computer Vision and Pattern Recognition, 2004 (CVPR 2004), Washington, DC, USA.

\* cited by examiner

| PARAMETER NAME | NUMBER | DESCRIPTION |
|---|---|---|
| ID | 1 | IDENTIFIER FOR IDENTIFYING A DIFFERENT PLENOPTIC DATA STORAGE FORMAT |
| VersionMajor | 1 | THE MAJOR NUMBER OF THE VERSION OF A GIVEN PLENOPTIC DATA STORAGE FORMAT |
| VersionMinor | 1 | THE MINOR NUMBER OF THE VERSION OF A GIVEN PLENOPTIC DATA STORAGE FORMAT |
| HeaderSizeInBytes | 1 | THE SIZE OF AN ADDITIONAL INFORMATION SEGMENT USED IN THE PRESENT PLENOPTIC DATA STORAGE FORMAT |
| NoViews | 1 | THE TOTAL NUMBER OF CAMERAS INCLUDED IN THE CAMERA ARRAY SYSTEM THAT IS USED TO CONFIGURE THE PRESENT PLENOPTIC DATA |
| NoViewsHorizontal | 1 | THE NUMBER OF CAMERAS HORIZONTALLY ALIGNED IN THE CAMERA ARRAY THAT IS USED TO CONFIGURE THE PRESENT PLENOPTIC DATA |
| NoViewsVertical | 1 | THE NUMBER OF CAMERAS VERTICALLY ALIGNED IN THE CAMERA ARRAY THAT IS USED TO CONFIGURE THE PRESENT PLENOPTIC DATA |
| ImageWidthInPixel | 1 | THE NUMBER OF PIXELS IN THE WIDTH DIRECTION IN THE RESOLUTION OF A SINGLE CAMERA |
| ImageHeightInPixel | 1 | THE NUMBER OF PIXELS IN THE HEIGHT DIRECTION IN THE RESOLUTION OF A SINGLE CAMERA |
| CompressionFormat | 1 | A STANDARD FORMAT METHOD THAT IS USED WHEN PLENOPTIC VIDEO DATA IS COMPRESSED AND STORED USING A STANDARD VIDEO COMPRESSION METHOD |
| ReferenceCamID | 1 | THE IDENTIFIER OF THE CAMERA THAT IS USED AS A REFERENCE IN A COORDINATE SYSTEM, AMONG THE CAMERAS INCLUDED IN THE CAMERA ARRAY |

FIG. 4A

| | | |
|---|---|---|
| NoOfTotalFrames | 1 | THE NUMBER OF FRAMES ALONG THE TIME AXIS OF STORED PLENOPTIC VIDEO |
| RealDepthMin | 1 | THE MINIMUM DEPTH VALUE OF STORED PLENOPTIC DATA BASED ON ACTUAL MEASUREMENTS (THE SHORTEST DISTANCE AMONG DISTANCES FROM CAMERAS) |
| RealDepthMax | 1 | THE MAXIMUM DEPTH VALUE OF STORED PLENOPTIC DATA BASED ON ACTUAL MEASUREMENTS (THE LONGEST DISTANCE AMONG DISTANCES FROM CAMERAS) |
| NormalizedDepthMin | 1 | THE VALUE ACQUIRED BY NORMALIZING THE MINIMUM DEPTH VALUE OF STORED PLENOPTIC DATA IN A CERTAIN RANGE (E.G., A RANGE FROM 0.0 TO 1.0) (THE SHORTEST DISTANCE AMONG DISTANCES FROM CAMERAS) |
| NormalizedDepthMax | 1 | THE VALUE ACQUIRED BY NORMALIZING THE MAXIMUM DEPTH VALUE OF STORED PLENOPTIC DATA IN A CERTAIN RANGE (E.G., A RANGE FROM 0.0 TO 1.0) (THE LONGEST DISTANCE AMONG DISTANCES FROM CAMERAS) |
| FlagIsRectified | 1 | A FLAG INDICATING WHETHER STORED PLENOPTIC DATA IS OPTICALLY RECTIFIED |
| FlagHaveHomogrMat | 1 | A FLAG INDICATING WHETHER A HOMOGRAPHY TRANSFORMATION PARAMETER FOR SUPPORTING TRANSFER TO THE COORDINATE SYSTEM OF A SPECIFIC CAMERA IS INCLUDED |
| FlagHaveAlpha | 1 | A FLAG INDICATING WHETHER AN ALPHA CHANNEL REPRESENTING THE DEGREE OF TRANSPARENCY OF IMAGE DATA IS INCLUDED |
| FlagHaveDepth | 1 | A FLAG INDICATING WHETHER SEPARATE DEPTH INFORMATION DATA IS INCLUDED |
| FlagHaveInterCamParam | 1 | A FLAG INDICATING WHETHER A PARAMETER REPRESENTING THE RELATIONSHIP BETWEEN CAMERAS IS INCLUDED |

FIG. 4B

| PARAMETER NAME | NUMBER | DESCRIPTION |
|---|---|---|
| SizeInBytes | 1 PER CAM | THE SIZE OF AN ADDITIONAL DATA SEGMENT FOR EACH CAMERA |
| OffsetInBytes | 1 PER CAM | THE DISTANCE (THE DISTANCE IN BYTES) FROM THE BEGINNING OF THE ADDITIONAL DATA OF THE FIRST CAMERA TO THE ADDITIONAL DATA OF EACH CAMERA |
| SizeInBytesAlpha | 1 PER CAM | THE SIZE OF PLENOPTIC TRANSPARENCY DATA WHEN THE PLENOPTIC TRANSPARENCY DATA IS INCLUDED |
| OffsetInBytesAlpha | 1 PER CAM | THE DISTANCE FROM THE BEGINNING OF THE ADDITIONAL DATA OF THE FIRST CAMERA TO PLENOPTIC TRANSPARENCY DATA WHEN THE PLENOPTIC TRANSPARENCY DATA IS INCLUDED |
| SizeInBytesDepth | 1 PER CAM | THE SIZE OF PLENOPTIC DEPTH INFORMATION DATA WHEN THE PLENOPTIC DEPTH INFORMATION DATA IS INCLUDED |
| OffsetInBytesDepth | 1 PER CAM | THE DISTANCE FROM THE BEGINNING OF THE ADDITIONAL DATA OF THE FIRST CAMERA TO PLENOPTIC DEPTH INFORMATION DATA WHEN THE PLENOPTIC DEPTH INFORMATION DATA IS INCLUDED |
| HomographyMat[9] | 1 PER CAM | A 3 × 3 MATRIX FOR HOMOGRAPHY COORDINATE TRANSFORMATION FOR TRANSFORMING THE COORDINATE SYSTEM OF THE CAMERA, TO WHICH THE PRESENT ADDITIONAL DATA PERTAINS, INTO THE COORDINATE SYSTEM OF THE DESIGNATED REFERENCE CAMERA |
| CameraParam[9] | 1 PER CAM | A 3 × 3 MATRIX FOR SPECIFYING THE INTERNAL CAMERA PARAMETER OF THE CAMERA TO WHICH THE PRESENT ADDITIONAL DATA PERTAINS |
| DistortionParam[5] | 1 PER CAM | A 1 × 5 MATRIX FOR SPECIFYING THE LENS DISTORTION COEFFICIENTS OF THE CAMERA TO WHICH THE PRESENT ADDITIONAL DATA PERTAINS |
| CameraPositionX | 1 PER CAM | THE HORIZONTAL POSITION OF THE CURRENT CAMERA IN THE COORDINATE SYSTEM OF THE DESIGNATED REFERENCE CAMERA |
| CameraPositionY | 1 PER CAM | THE VERTICAL POSITION OF THE CURRENT CAMERA IN THE COORDINATE SYSTEM OF THE DESIGNATED REFERENCE CAMERA |

FIG. 5

| PARAMETER NAME | NUMBER | DESCRIPTION |
|---|---|---|
| EssentialMat[9] | 1 PER PAIR OF CAM | AN ESSENTIAL MATRIX BETWEEN THE TWO DESIGNATED CAMERAS |
| FundamentalMat[9] | 1 PER PAIR OF CAM | A FUNDAMENTAL MATRIX BETWEEN THE TWO DESIGNATED CAMERAS |
| RotationMat[9] | 1 PER PAIR OF CAM | A ROTATION MATRIX BETWEEN THE TWO DESIGNATED CAMERAS |
| TranslationMat[3] | 1 PER PAIR OF CAM | A TRANSLATION MATRIX BETWEEN THE TWO DESIGNATED CAMERAS |

FIG. 6

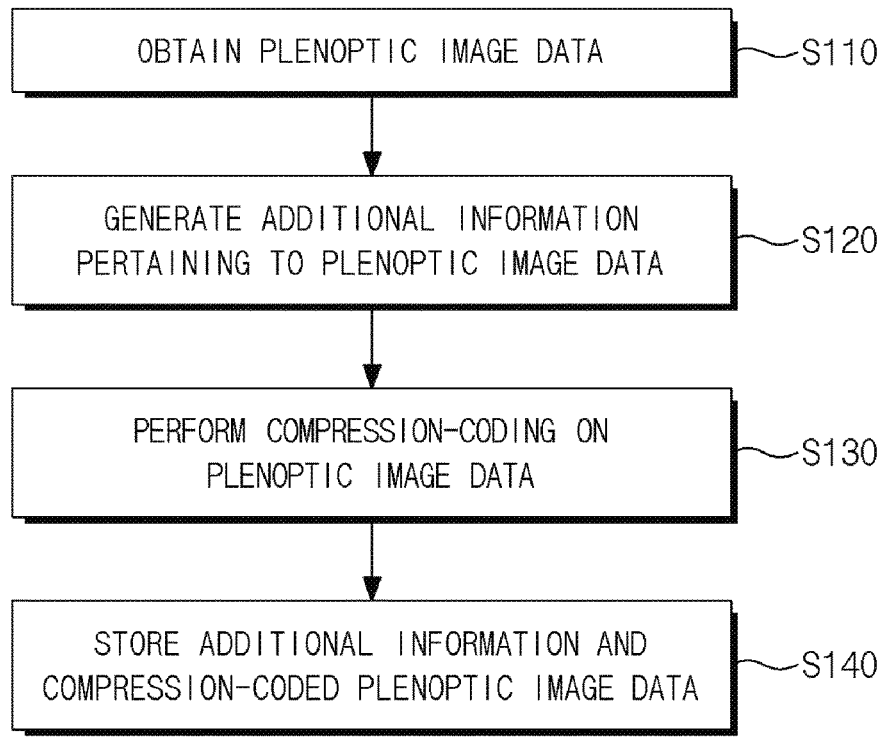

FIG. 7

PLENOPTIC DATA STORAGE SYSTEM AND OPERATING METHOD THEREOF

CROSS REFERENCE TO RELATED APPLICATIONS

This application claims the benefit of Korean Patent Application No. 10-2018-0133535, filed Nov. 2, 2018, and No. 10-2019-0042863, filed Apr. 12, 2019, which are hereby incorporated by reference in their entireties into this application.

BACKGROUND OF THE INVENTION

1. Technical Field

The present invention relates to a plenoptic data storage system and a method for operating the same.

2. Description of the Related Art

Compared to existing image processing methods dependent on 2D camera image information, a plenoptic or light-field image provides information about light traveling in an arbitrary direction in space. That is, because it provides information about the intensity and color of light traveling in a sample direction for each pixel in a 2D image, the plenoptic or light-field image is suitable for realistically representing objects in the real world. Here, plenoptic image information includes angular domain information based on directional information as well as spatial domain information, which is included in an existing 2D image. Using the depth information in the spatial domain and information about a light direction in the angular domain, various image processing methods, such as changing a perspective viewpoint, refocusing, extracting the depth of field, and the like, may be performed. Because a plenoptic image includes additional optical information, depth values may be obtained therefrom, and the image may be accurately refocused. Also, unlike a structured-light camera, a plenoptic camera enables depth information processing for an image captured outdoors. Plenoptic image processing techniques include integral imaging using a camera array, a volumetric method for physically forming actual light-emitting points within a 3D volume, holography using a light interference effect, and the like.

DOCUMENTS OF RELATED ART (Patent Document 1) Korean Patent Application Publication No. 10-2015-0106879, published on Sep. 22, 2015 and titled "Method and apparatus for adding annotation to plenoptic light field"
(Patent Document 2) Korean Patent Application Publication No. 10-2018-0053668, published on May 23, 2018 and titled "Method and apparatus for generating data representative of pixel beam"
(Patent Document 3) Japanese Patent Application Publication No. 2017-188729, published on Nov. 30, 2017 and titled "Information-processing device, information-processing method and program".

SUMMARY OF THE INVENTION

An object of the present invention is to provide a plenoptic data storage system for storing plenoptic image data, which is obtained using an m×n camera array device, in a storage device as video and a method for operating the plenoptic data storage system.

A method of operating a plenoptic data storage system according to an embodiment of the present invention may include obtaining plenoptic image data from a plenoptic camera array; generating additional information pertaining to the plenoptic image data; performing compression-coding on the plenoptic image data; and storing the additional information and the compression-coded plenoptic image data in a storage device in accordance with a storage format.

In an embodiment, obtaining the plenoptic image data may include converting physical base data obtained from the plenoptic camera array into a digital signal.

In an embodiment, the method may further include measuring optical parameters in order to configure a single plenoptic optical system using individual view images obtained from the plenoptic camera array.

In an embodiment, the optical parameters may include internal camera parameters of each camera, external parameters between cameras, and color transformation parameters for unifying color representation systems of the cameras.

In an embodiment, the method may further include transforming the plenoptic image data to a spatial coordinate system and a color coordinate system using the measured optical parameters.

In an embodiment, generating the additional information may include generating first additional information pertaining to the plenoptic camera array; generating second additional information required to be specified for each camera; and generating third additional information required to be specified for a pair of cameras.

In an embodiment, performing the compression-coding may include performing the compression-coding on the plenoptic image data using a dedicated plenoptic image coding method.

In an embodiment, performing the compression-coding may include performing the compression-coding on the plenoptic image data using a standard image compression method.

In an embodiment, storing the additional information and the compression-coded plenoptic image data may include storing the additional information and the compression-coded plenoptic image data in the storage device using a standardized method.

In an embodiment, the method may further include packetizing the additional information such that the additional information is read from the storage device through file access.

In an embodiment, the method may further include configuring the compression-coded plenoptic image data in accordance with the storage format such that the compression-coded plenoptic image data is read from the storage device through file access.

A plenoptic data storage system according to an embodiment of the present invention may include at least one processor and memory for storing at least one instruction executed by the at least one processor. The at least one instruction may be executed by the at least one processor in order to obtain plenoptic image data from a plenoptic camera array in a plenoptic image acquisition system, to generate additional information pertaining to the plenoptic image data in the plenoptic image acquisition system, to perform compression-coding on the plenoptic image data in the plenoptic image acquisition system, and to store the additional information and the compression-coded plenoptic image data in a storage device in accordance with a storage format in the plenoptic data storage system.

In an embodiment, the plenoptic image acquisition system may be configured to measure optical parameters from the plenoptic image data, to correct the plenoptic image data using the measured optical parameters, and to perform the compression-coding on the corrected plenoptic image data.

In an embodiment, the plenoptic image acquisition system may be configured to generate first additional information pertaining to the plenoptic camera array, to generate second additional information required to be specified for each camera, and to generate third additional information required to be specified for a pair of cameras.

In an embodiment, the plenoptic image data storage system may be configured to packetize the additional information such that the additional information is accessed in the storage device through file access; and to structure the compression-coded plenoptic image data such that the compression-coded plenoptic image data is accessed in the storage device through file access.

BRIEF DESCRIPTION OF THE DRAWINGS

The above and other objects, features and advantages of the present invention will be more clearly understood from the following detailed description taken in conjunction with the accompanying drawings, in which:

FIGS. 4A and 4B are views that illustrate additional plenoptic information according to an embodiment of the present invention;

FIG. 5 is a view that illustrates additional information specified for each camera according to an embodiment of the present invention;

FIG. 6 is a view that illustrates additional information specified for a pair of cameras according to an embodiment of the present invention; and FIG. 7 is a flowchart that illustrates a method for operating a plenoptic data storage system according to an embodiment of the present invention.

DESCRIPTION OF THE PREFERRED EMBODIMENTS

Figure 1:
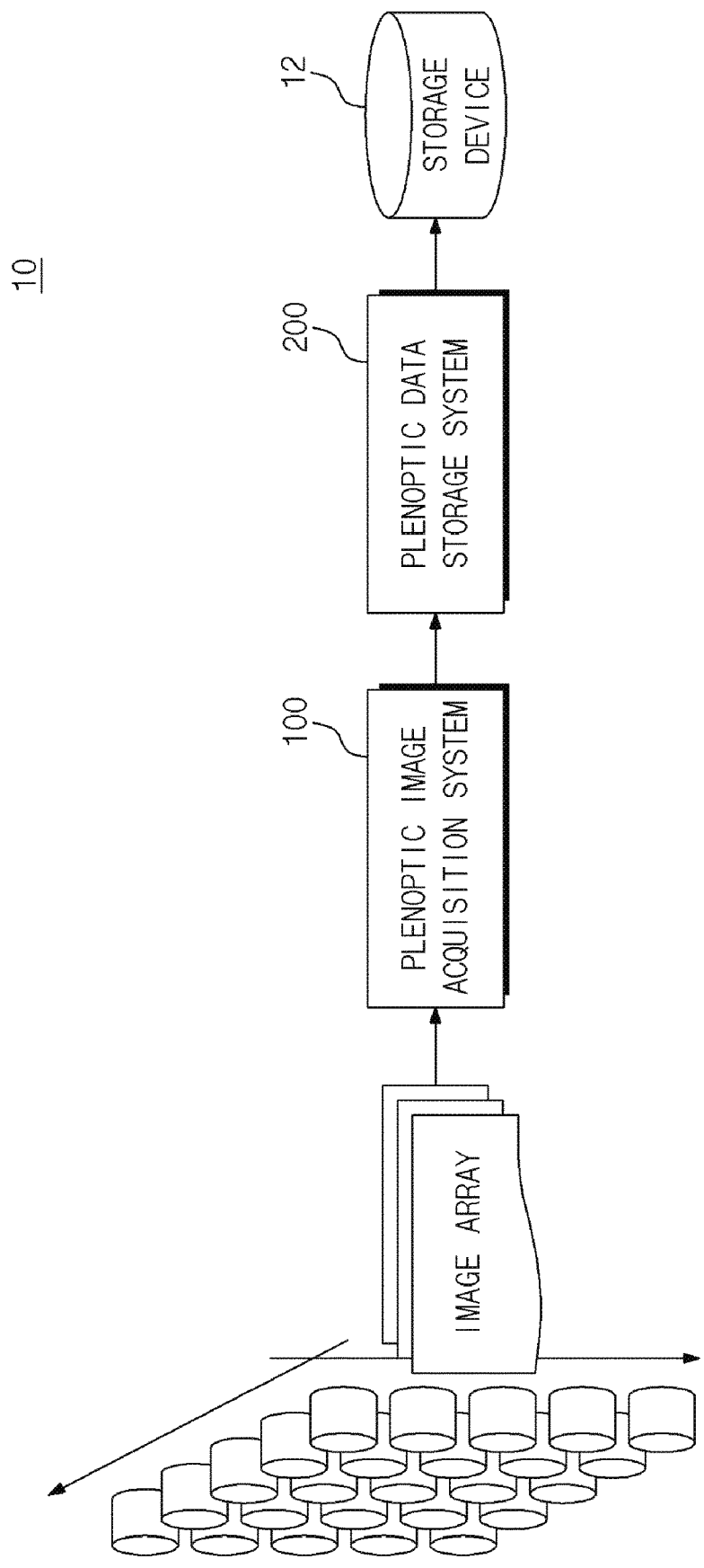
FIG. 1 is a view that illustrates a plenoptic data storage system according to an embodiment of the present invention.

The present invention will be described in detail below with reference to the accompanying drawings so that those having ordinary knowledge in the technical field to which the present invention pertains can easily practice the present invention.

Because the present invention may be variously changed and may have various embodiments, specific embodiments will be described in detail below with reference to the accompanying drawings. However, it should be understood that those embodiments are not intended to limit the present invention to specific disclosure forms and that they include all changes, equivalents or modifications included in the spirit and scope of the present invention. It will be understood that, although the terms "first," "second," etc. may be used herein to describe various elements, these elements are not intended to be limited by these terms.

These terms are only used to distinguish one element from another element. For example, a first element could be referred to as a second element without departing from the scope of rights of the present invention. Similarly, a second element could also be referred to as a first element. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Also, the terms used herein are used merely to describe specific embodiments, and are not intended to limit the present invention. A singular expression includes a plural expression unless a description to the contrary is specifically pointed out in context.

In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added. Unless differently defined, all terms used herein, including technical or scientific terms, have the same meanings as terms generally understood by those skilled in the art to which the present invention pertains. Terms identical to those defined in generally used dictionaries should be interpreted as having meanings identical to contextual meanings of the related art, and are not to be interpreted as having ideal or excessively formal meanings unless they are definitively defined in the present specification.

Generally, plenoptic data may include information about light distribution in a space by obtaining not only spatial coordinate values but also an angular value, which is different at each point in the space, when light information is captured. Accordingly, after the light information is captured, the light distribution in the space may be freely reconstructed using only the data obtained when it is captured, and an image may be generated based on optical reconstruction in the space, such as post-capture refocusing, post-capture viewpoint changing, and the like. The plenoptic data storage system and a method for operating the same according to an embodiment of the present invention may store plenoptic data in a storage device along with additional information that is necessary in order to reconstruct an optical system using the stored plenoptic data.

FIG. 1 is a view that illustrates a system 10 for storing plenoptic data according to an embodiment of the present invention. Referring to FIG. 1, the system 10 may include a plenoptic image acquisition system 100 and a plenoptic data storage system 200.

The plenoptic image acquisition system 100 may be implemented so as to obtain a processable digital signal from video, which is obtained using an array 11 of plenoptic cameras.

The plenoptic data storage system 200 may be implemented so as to process plenoptic video data, obtained from the plenoptic image acquisition system 100, in a form that can be stored in a storage device 12. Here, the storage device 12 may include various types of volatile or nonvolatile memory devices.

The system 10 for storing plenoptic data according to an embodiment of the present invention obtains plenoptic image data from a plenoptic camera array, generates additional information pertaining thereto, performs compression-coding on the plenoptic image data, and stores the additional information and the compression-coded plenoptic image data in the storage device 12 in accordance with a storage format. Accordingly, an optical system may be freely reconstructed using the stored plenoptic data, whereby a 2D or 3D image may be generated therefrom.

Figure 2:
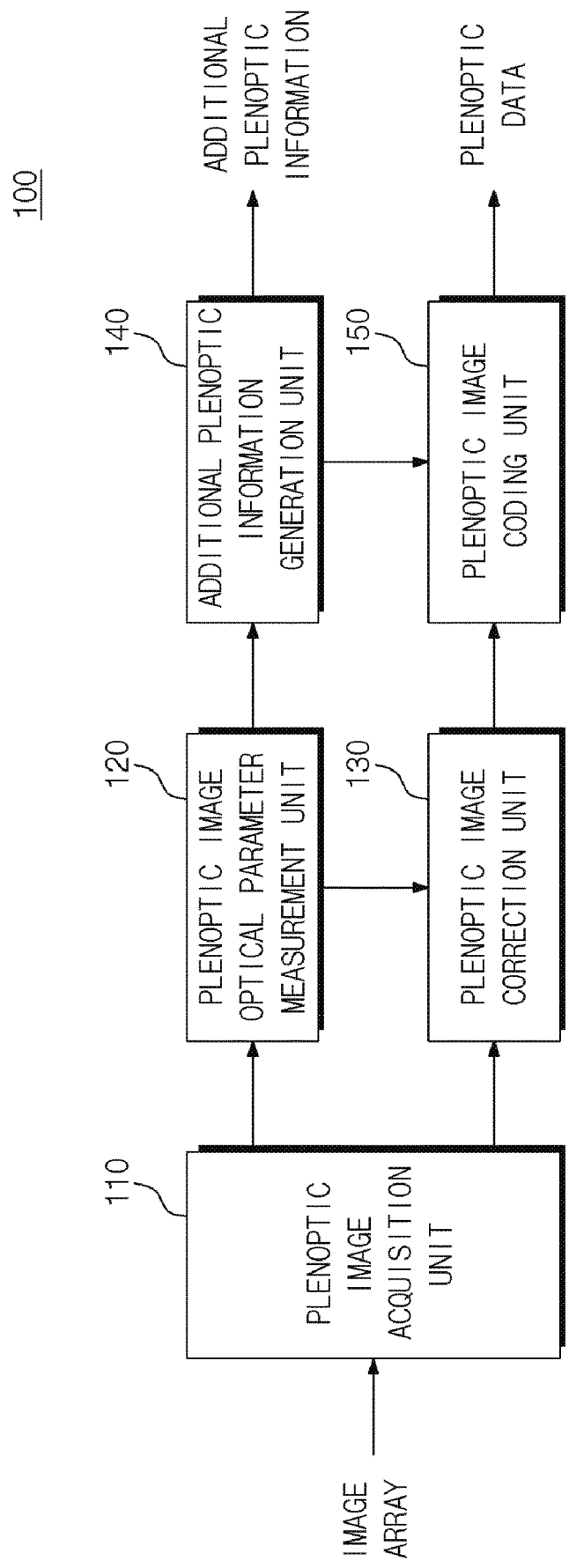
FIG. 2 is a view that illustrates a plenoptic image acquisition system according to an embodiment of the present invention.

FIG. 2 is a view that illustrates a plenoptic image acquisition system 100 according to an embodiment of the present invention. Referring to FIG. 2, the plenoptic image acquisition system 100 may include a plenoptic image acquisition unit 110, a plenoptic image optical parameter measurement unit 120, a plenoptic image correction unit 130, an additional plenoptic information generation unit 140, and a plenoptic image coding unit 150.

The plenoptic image acquisition unit 110 may be implemented so as to convert physical base data, obtained from an array 11 of plenoptic cameras, into a digital signal and to store the digital signal. Here, the array 11 may capture images simultaneously using the multiple cameras that are located at different positions in order to individually obtain information about light beams incident at different angles. In an embodiment, the plenoptic image acquisition unit 110 may obtain a base image, for which digital conversion, such as YUV/RGB or the like, is performed depending on the type of plenoptic cameras in the array 11 after being captured by each of the cameras.

The plenoptic image optical parameter measurement unit 120 may be implemented so as to measure optical parameters in order to configure a single plenoptic optical system using the individual view images obtained from the m×n camera array 11. In an embodiment, the optical parameters to be measured may include the camera internal parameters of each camera, external parameters between cameras, and color transformation parameters for unifying the color representation systems of cameras.

The plenoptic image correction unit 130 may be implemented so as to transform respective images to a single spatial coordinate system and a single color coordinate system using the optical parameters measured by the plenoptic image optical parameter measurement unit 120.

The additional plenoptic information generation unit 140 may be implemented so as to generate additional information required for storing camera-array-based plenoptic data. Here, the generated additional information may be stored in the storage device 12 along with the plenoptic image. The additional information, read from the storage device 12, may be used to configure the original plenoptic optical system.

The plenoptic image coding unit 150 may be implemented so as to perform compression-coding on the obtained plenoptic image data in order to reduce the size thereof such that the plenoptic data can be stored. In an embodiment, a dedicated plenoptic image coding method may be used to perform the compression-coding. In another embodiment, compression-coding may be performed by aggregating data output from the respective cameras or data output from a certain number of cameras and applying an existing image-compression-coding standard thereto.

Meanwhile, using the compression-coded plenoptic video data and the additional information pertaining thereto, which are generated by the plenoptic image acquisition system 100, the plenoptic data storage system 200 may store plenoptic data in the storage device 12 based on a standardized method.

Figure 3:
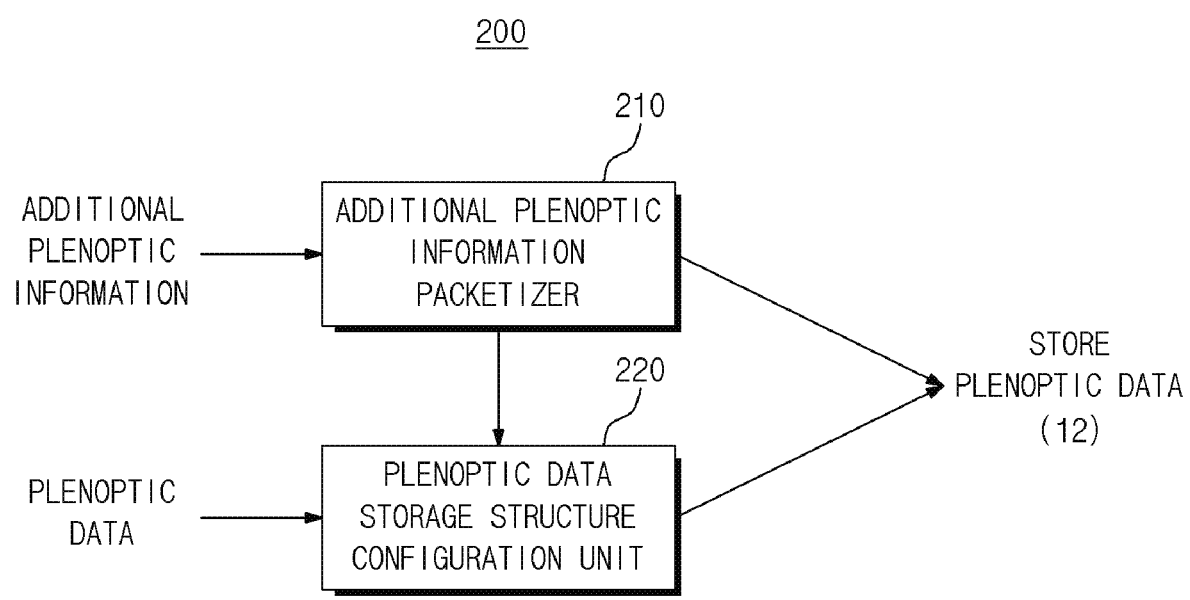
FIG. 3 is a view that illustrates a plenoptic data storage system according to an embodiment of the present invention.

FIG. 3 is a view that illustrates a plenoptic data storage system 200 according to an embodiment of the present invention. Referring to FIG. 3, the plenoptic data storage system 200 may include an additional plenoptic information packetizer 210 and a plenoptic data storage structure configuration unit 220.

The additional plenoptic information packetizer 210 may be implemented so as to structure additional information pertaining to plenoptic video data in order to enable the additional information to be handled through file access.

The plenoptic data storage structure configuration unit 220 may be implemented so as to store compression-coded plenoptic video data in a suitable structure and to form a storage structure in order to immediately read required data from a storage location (that is, in order to enable file access).

The plenoptic data structured for storage, which is generated in the plenoptic data storage system 200, may be finally stored in the storage device 12.

FIGS. 4A and 4B are views that illustrate additional plenoptic information according to an embodiment of the present invention. Referring to FIGS. 4A and 4B, first additional information for a set of plenoptic cameras is illustrated. Here, 'ID' is an identifier for identifying a different plenoptic data storage format, 'VersionMajor' is the major number of the version of a given plenoptic data storage format, 'VersionMinor' is the minor number thereof, 'HeaderSizeInBytes' is the size of an additional information segment used in the present plenoptic data storage format, 'NoViews' is the total number of cameras included in a camera array system that is used to configure the present plenoptic data, 'NoViewsHorizontal' is the number of cameras horizontally aligned in the camera array that is used to configure the present plenoptic data, 'NoViewsVertical' is the number of cameras vertically aligned in the camera array that is used to configure the present plenoptic data, 'ImageWidthInPixel' is the number of pixels in the width direction in the resolution of a single camera, 'ImageHeightInPixel' is the number of pixels in the height direction in the resolution of a single camera, 'CompressionFormat' is a standard format method that is used when plenoptic video data is compressed and stored using a standard video compression method, 'ReferenceCamID' is the identifier of the camera used as a reference in a coordinate system, among the cameras included in the camera array, 'NoOffotal-Frames' is the number of frames along the time axis of stored plenoptic video, 'RealDepthMin' is the minimum depth value of stored plenoptic data based on actual measurements (the shortest distance among distances from cameras), 'RealDepthMax' is the maximum depth value of stored plenoptic data based on actual measurements (the longest distance among distances from cameras), 'NormalizedDepthMin' is a value acquired by normalizing the minimum depth value of stored plenoptic data (the shortest distance among distances from cameras) in a certain range (e.g., a range from 0.0 to 1.0), 'NormalizedDepthMax' is a value acquired by normalizing the maximum depth value of stored plenoptic data (the longest distance among distances from cameras) in a certain range (e.g., a range from 0.0 to 1.0), 'FlagIsRectified' is a flag indicating whether stored plenoptic data is optically rectified, 'FlagHaveHomogrMat' is a flag indicating whether a homography transformation parameter for supporting the transfer to the coordinate system of a specific camera is included, 'FlagHaveAlpha' is a flag indicating whether an alpha channel representing the degree of transparency of image data is included, 'FlagHaveDepth' is a flag indicating whether separate depth information data is included, and 'FlagHaveInterCamParam' is a flag indicating whether a parameter representing the relationship between cameras is included.

Meanwhile, unlike the additional information of FIGS. 4A and 4B, which corresponds to a camera array, additional information that includes the features of each camera is also required.

FIG. 5 is a view that illustrates additional information specified for each camera according to an embodiment of the present invention. Referring to FIG. 5, second additional information that should be specified for each camera is illustrated. Here, 'SizeInBytes' indicates the size of an additional data segment for each camera, 'OffsetInBytes' indicates a distance (bytes) from the beginning of the additional data of the first camera to the additional data of each camera, 'SizeInBytesAlpha' indicates the size of plenoptic transparency data when the plenoptic transparency data is included, 'OffsetInBytesAlpha' indicates a distance (bytes) from the beginning of the additional data of the first camera to plenoptic transparency data when the plenoptic transparency data is included, 'SizeInBytesDepth' indicates the size of plenoptic depth information data when the plenoptic depth information data is included, 'OffsetInBytesDepth' indicates the distance from the beginning of the additional data of the first camera to plenoptic depth information data when the plenoptic depth information data is included, 'HomographyMat[9]' is a 3×3 matrix for homography coordinate transformation for transforming the coordinate system of the camera, to which the present additional data pertains, into the coordinate system of a designated reference camera, 'CameraParam[9]' is a 3×3 matrix for specifying the internal camera parameters of the camera to which the present additional data pertains, 'DistortionParam[5]' is a 1×5 matrix for specifying the lens distortion coefficients of the camera to which the present additional data pertains, 'CameraPositionX' indicates the horizontal position of the current camera in the coordinate system of the designated reference camera, and 'CameraPositionY' indicates the vertical position of the current camera in the coordinate system of the designated reference camera.

FIG. 6 is a view that illustrates additional information specified between a pair of cameras according to an embodiment of the present invention. Referring to FIG. 6, third additional information that should be specified between a pair of cameras is illustrated. Here, 'EssentialMat[9]' is an essential matrix between the two designated cameras, 'FundamentalMat[9]' is a fundamental matrix between the two designated cameras, 'RotationMat[9]' is a rotation matrix between the two designated cameras, and 'TranslationMat[3]' is a translation matrix between the two designated cameras.

FIG. 7 is a flowchart that illustrates a method for operating a system 10 for storing plenoptic data according to an embodiment of the present invention. Referring to FIGS. 1 to 7, the system 10 may operate as follows.

Plenoptic image data may be obtained from an m×n plenoptic camera array 11 at step S110. Here, m and n are natural numbers, each of which is equal to or greater than 2. Then, additional information pertaining to the plenoptic image data may be generated at step S120. Compression-coding may be performed on the plenoptic image data at step S130. The additional information and the compression-coded plenoptic image data may be structured for storage and may then be stored in a storage device 12 at step S140.

According to an embodiment, some or all of the steps and/or operations may be at least partially implemented or performed using one or more processors that execute instructions, programs, interactive data structures, and client and/or server components stored in nonvolatile computer-readable media.

The above-described embodiments may be implemented through hardware components, software components, and/or a combination thereof. For example, the apparatus, method and components described in the embodiments may be implemented using one or more general-purpose computers or special-purpose computers, for example, a processor, a controller, an arithmetic logic unit (ALU), a digital signal processor, a microcomputer, a field-programmable gate array (FPGA), a programmable logic unit (PLU), a microprocessor, or any other device capable of executing instructions and responding thereto. The processing device may run an operating system (OS) and one or more software applications executed on the OS.

Also, the processing device may access, store, manipulate, process and create data in response to execution of the software. For the convenience of description, the processing device is described as a single device, but those having ordinary skill in the art will understand that the processing device may include multiple processing elements and/or multiple forms of processing elements. For example, the processing device may include multiple processors or a single processor and a single controller. Also, other processing configurations such as parallel processors may be available.

The software may include a computer program, code, instructions, or a combination thereof, and may configure a processing device to be operated as desired, or may independently or collectively instruct the processing device to be operated. The software and/or data may be permanently or temporarily embodied in a specific form of machines, components, physical equipment, virtual equipment, computer storage media or devices, or transmitted signal waves in order to be interpreted by a processing device or to provide instructions or data to the processing device. The software may be distributed across computer systems connected with each other via a network, and may be stored or run in a distributed manner. The software and data may be stored in one or more computer-readable storage media.

The method according to the embodiments may be implemented as program instructions executable by various computer devices, and may be recorded in computer-readable storage media. The computer-readable storage media may individually or collectively include program instructions, data files, data structures, and the like. The program instructions recorded in the media may be specially designed and configured for the embodiment, or may be readily available and well known to computer software experts.

Examples of the computer-readable storage media include magnetic media such as a hard disk, a floppy disk and a magnetic tape, optical media such as a CD-ROM and a DVD, and magneto-optical media such as a floptical disk, ROM, RAM, flash memory, and the like, that is, a hardware device specially configured for storing and executing program instructions. Examples of the program instructions include not only machine code made by a compiler but also high-level language code executable by a computer using an interpreter or the like. The above-mentioned hardware device may be configured so as to operate as one or more software modules in order to perform the operations of the embodiment, and vice-versa.

The plenoptic data storage system according to an embodiment of the present invention includes at least one processor and memory for storing at least one instruction executed by the at least one processor. The at least one processor may be executed by the at least one processor in order to obtain plenoptic image data from a plenoptic camera array in a plenoptic image acquisition system, to generate additional information pertaining to the plenoptic image data in the plenoptic image acquisition system, to perform compression-coding on the plenoptic image data in the plenoptic image acquisition system, and to store the additional information and the compression-coded data in a storage device in accordance with a storage format in the plenoptic data storage system.

A plenoptic data storage system and a method for operating the same according to an embodiment of the present invention enable plenoptic image data, obtained using an m×n camera array device, to be stored in a storage device as video, whereby a 2D or 3D image may be generated from the stored plenoptic data by freely reconstructing an optical system.

Meanwhile, the above description is merely specific embodiments for practicing the present invention. The present invention encompasses not only concrete and available means but also the technical spirit corresponding to abstract and conceptual ideas that may be used as future technology.

What is claimed is:

1. A method of operating a plenoptic data storage system, comprising:
   obtaining plenoptic image data from a plenoptic camera array;
   generating additional information pertaining to the plenoptic image data;
   performing compression-coding on the plenoptic image data;
   storing the additional information and the compression-coded plenoptic image data in a storage device in accordance with a storage format; and
   measuring optical parameters in order to configure a single plenoptic optical system using individual view images obtained from the plenoptic camera array.

2. The method of claim 1, wherein obtaining the plenoptic image data comprises:
   converting physical base data obtained from the plenoptic camera array into a digital signal.

3. The method of claim 1, wherein the optical parameters include internal camera parameters of each camera, external parameters between cameras, and color transformation parameters for unifying color representation systems of the cameras.

4. The method of claim 1, further comprising:
   transforming the plenoptic image data to a spatial coordinate system and a color coordinate system using the measured optical parameters.

5. The method of claim 1, wherein generating the additional information comprises:
   generating first additional information pertaining to the plenoptic camera array;
   generating second additional information required to be specified for each camera; and
   generating third additional information required to be specified for a pair of cameras.

6. The method of claim 1, wherein performing the compression-coding comprises:
   performing the compression-coding on the plenoptic image data using a dedicated plenoptic image coding method.

7. The method of claim 1, wherein performing the compression-coding comprises:
   performing the compression-coding on the plenoptic image data using a standard image compression method.

8. The method of claim 1, wherein storing the additional information and the compression-coded plenoptic image data comprises:
   storing the additional information and the compression-coded plenoptic image data in the storage device using a standardized method.

9. The method of claim 8, further comprising:
   packetizing the additional information such that the additional information is read from the storage device through file access.

10. The method of claim 8, further comprising:
    configuring the compression-coded plenoptic image data in accordance with the storage format such that the compression-coded plenoptic image data is read from the storage device through file access.

11. A plenoptic data storage system, comprising:
    at least one processor; and
    memory for storing at least one instruction executed by the at least one processor,
    wherein the at least one instruction is executed by the at least one processor in order to obtain plenoptic image data from a plenoptic camera array in a plenoptic image acquisition system, to generate additional information pertaining to the plenoptic image data in the plenoptic image acquisition system, to perform compression-coding on the plenoptic image data in the plenoptic image acquisition system, to store the additional information and the compression-coded plenoptic image data in a storage device in accordance with a storage format in the plenoptic data storage system, and to measure optical parameters in order to configure a single plenoptic optical system using individual view images obtained from the plenoptic camera array.

12. The plenoptic data storage system of claim 11, wherein the plenoptic image acquisition system is configured to:
    measure optical parameters from the plenoptic image data;
    correct the plenoptic image data using the measured optical parameters; and
    perform the compression-coding on the corrected plenoptic image data.

13. The plenoptic data storage system of claim 12, wherein the plenoptic image acquisition system is configured to:
    generate first additional information pertaining to the plenoptic camera array;
    generate second additional information required to be specified for each camera; and
    generate third additional information required to be specified for a pair of cameras.

14. The plenoptic data storage system of claim 12, wherein the plenoptic image data storage system is configured to:
    packetize the additional information such that the additional information is accessed in the storage device through file access; and
    structure the compression-coded plenoptic image data such that the compression-coded plenoptic image data is accessed in the storage device through file access.

* * * * *